United States Patent
Jung

(10) Patent No.: US 9,825,573 B2
(45) Date of Patent: Nov. 21, 2017

(54) DEVICE FOR RIPPLE CONTROLLING AN ALTERNATOR AND METHOD FOR RIPPLE CONTROLLING THE SAME

(71) Applicant: HYUNDAI MOTOR COMPANY, Seoul (KR)

(72) Inventor: Byung Hwan Jung, Gwangmyeong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 105 days.

(21) Appl. No.: 14/920,757

(22) Filed: Oct. 22, 2015

(65) Prior Publication Data

US 2016/0373039 A1 Dec. 22, 2016

(30) Foreign Application Priority Data

Jun. 16, 2015 (KR) .................. 10-2015-0084918

(51) Int. Cl.
| | | |
|---|---|---|
| H02K 11/00 | (2016.01) | |
| H02P 25/098 | (2016.01) | |
| H02P 9/02 | (2006.01) | |
| F03D 9/00 | (2016.01) | |
| H02P 9/04 | (2006.01) | |

(52) U.S. Cl.
CPC .............. *H02P 25/098* (2016.02); *H02P 9/02* (2013.01)

(58) Field of Classification Search
USPC ............................................. 322/58; 290/44
See application file for complete search history.

(56) References Cited

U.S. PATENT DOCUMENTS

| | | | | |
|---|---|---|---|---|
| 5,083,039 A | * | 1/1992 | Richardson | F03D 7/0272 |
| | | | | 290/44 |
| 5,128,654 A | * | 7/1992 | Griffin | G08B 13/19 |
| | | | | 250/342 |
| 5,798,631 A | * | 8/1998 | Spee | F03D 7/0272 |
| | | | | 290/31 |
| 6,382,163 B1 | * | 5/2002 | Murray | B60K 6/485 |
| | | | | 123/192.1 |
| 7,847,526 B2 | * | 12/2010 | Tan | H02P 9/42 |
| | | | | 322/44 |
| 7,982,326 B2 | * | 7/2011 | Tan | H02P 9/42 |
| | | | | 290/44 |
| 9,570,913 B2 | * | 2/2017 | Andresen | H02J 3/36 |
| 9,621,100 B2 | * | 4/2017 | Asai | H02P 9/48 |
| 9,641,367 B2 | * | 5/2017 | Shimizu | H04L 27/20 |
| 9,647,595 B2 | * | 5/2017 | Wai | H02P 25/098 |
| 9,656,658 B2 | * | 5/2017 | Hata | B60K 6/445 |
| 2009/0085354 A1 | * | 4/2009 | Tan | H02P 9/42 |
| | | | | 290/44 |
| 2009/0322079 A1 | * | 12/2009 | Letas | H02J 13/0034 |
| | | | | 290/7 |

(Continued)

FOREIGN PATENT DOCUMENTS

| | | |
|---|---|---|
| KR | 10-0915245 B1 | 9/2009 |
| KR | 10-1454444 B1 | 10/2014 |

*Primary Examiner* — Pedro J Cuevas
(74) *Attorney, Agent, or Firm* — McDermott Will & Emery LLP

(57) ABSTRACT

A device for ripple controlling an alternator includes an alternator including a rotor and a stator, a detector for detecting a rotation position of the rotor, and a controller for controlling the alternator to generate a toque ripple with an opposite phase to a rotation of a crankshaft of an engine.

8 Claims, 5 Drawing Sheets

(56) References Cited

U.S. PATENT DOCUMENTS

| | | | |
|---|---|---|---|
| 2011/0018281 A1* | 1/2011 | Tan | H02P 9/42 |
| | | | 290/55 |
| 2013/0217524 A1 | 8/2013 | Antchak et al. | |
| 2015/0021914 A1* | 1/2015 | Kim | H02M 1/14 |
| | | | 290/44 |
| 2015/0061547 A1* | 3/2015 | Gougani | H02P 5/526 |
| | | | 318/85 |
| 2015/0311719 A1* | 10/2015 | Andresen | H02J 3/36 |
| | | | 307/82 |

* cited by examiner

DEVICE FOR RIPPLE CONTROLLING AN ALTERNATOR AND METHOD FOR RIPPLE CONTROLLING THE SAME

CROSS-REFERENCE TO RELATED APPLICATION

This application claims the benefit of priority to Korean Patent Application No. 10-2015-0084918, filed on Jun. 16, 2015 with the Korean Intellectual Property Office, the entire contents of which are incorporated herein by reference.

TECHNICAL FIELD

The present disclosure is a device for ripple controlling an alternator and a method for ripple controlling the same.

BACKGROUND

A rotation of a crankshaft in an internal combustion engine includes a rotation fluctuation of a constant size. An instantaneous rotation fluctuation of the crankshaft generates a slip of a belt due to an instantaneous driving load in an accessory pulley of an engine Front End Accessory Drive (FEAD) belt system or an accessory belt system.

A noise and an abrasion at the accessory belt is caused by such a slip of the pulley and the belt, and a span vibration of the FEAD belt is generated by an excitation force of a periodic ascending or descending in the length direction of the belt.

An alternator of the accessory belt system includes a rotor having a large inertial force and a small pulley. Accordingly, a driving load is generated that is larger than that of the other pulley by the instantaneous rotation fluctuation of the crankshaft.

Therefore the slip of the belt is largely generated in the pulley of the alternator. Accordingly, a pulley may be used that includes special functions such as an Over-running Alternator Pulley (OAP) and an Over-running Alternator Decoupler (OAD) to improve durability and a noise of the accessory belt.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a device for ripple controlling of an alternator and a method for ripple controlling using the same is capable of reducing a load of the accessory belt without using the pulley having special function.

An exemplary embodiment of the present disclosure provides device for ripple controlling of an alternator that may comprise: an alternator including a rotor and a stator; a detector for detecting a rotation position of the rotor; and a controller for controlling the alternator to generate a toque ripple with a opposite phase to a rotation of a crankshaft of an engine.

The controller may control an output current of the alternator.

The controller may synchronize a cycle of the rotation of the crankshaft and a cycle of the torque ripple.

The controller may calculate an inverse phase timing of the crankshaft using a rotation signal of the crankshaft or a camshaft that is detected from the engine or an Electronic Control Unit (ECU).

The controller may calculate an inverse phase timing of the crankshaft using a signal of a spark plug or a fuel injector.

An exemplary embodiment of the present disclosure provides a method for ripple controlling an alternator by a device for ripple controlling of the alternator, the method may comprise: detecting a rotation position of a rotor of the alternator; detecting a cycle of a rotation shift of a crankshaft of an engine; and generating a torque ripple with an opposite phase to the rotation shift of the crankshaft.

The step of detecting the cycle of the rotation shift may include calculating an inverse phase timing of the crankshaft.

The step of calculating the inverse phase timing may include calculating the inverse phase timing using a rotation signal of the crankshaft or a camshaft, or a signal of a spark plug or a fuel injector.

The step of generating a torque ripple may include synchronizing the cycle of the rotation shift of the crankshaft and a cycle of the torque ripple.

According to the present disclosure for achieving the object, by synchronizing a cycle of the torque ripple of the alternator with the cycle of the rotation shift of the crankshaft, it is possible to provide the environment to reduce a load of the accessory belt and improve a slip and an abrasion at the pulley of the alternator.

DETAILED DESCRIPTION

Figure 1:
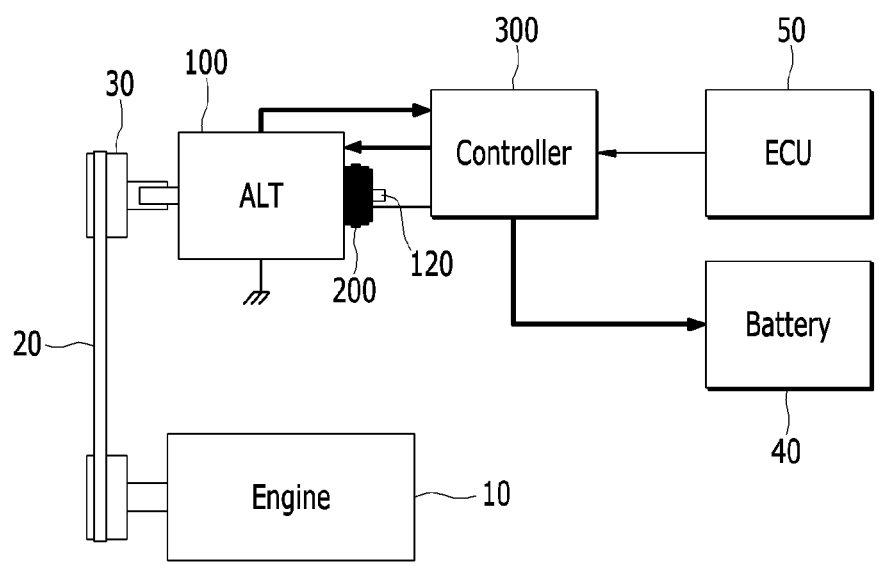
FIG. 1 is a schematic diagram of a device for ripple controlling an alternator according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements.

In addition, the terms "-er", "-or" and "module" described in the specification mean units for processing at least one function and operation and can be implemented by hardware components or software components and combinations thereof.

Now a device for ripple controlling of an alternator and method for ripple controlling using the same according to an exemplary embodiment of the present disclosure will be described in detail reference to FIG. 1 through FIG. 5.

FIG. 1 is a schematic diagram of a device for ripple controlling an alternator according to an exemplary embodiment of the present disclosure. In this case, the device for ripple controlling the alternator describes only a schematic configuration necessary for description according to an exemplary embodiment of the present disclosure, and the present disclosure is not limited to such a configuration.

Referring to FIG. 1, the device for ripple controlling the alternator according an exemplary embodiment of the present disclosure includes an alternator 100, a detector 200 and a controller 300.

The alternator 100 may be connected to an engine 10 through a pulley 30 and an accessory belt 20. The alternator 100 may generate electrical currents required a vehicle using the torque of crankshaft of the engine 10, and supply it to the vehicle.

The alternator 100 according to an exemplary embodiment of the present disclosure includes a rotor (not shown) and a stator (not shown).

The rotor is connected to the pulley 30 through a rotor shaft 120. A coil is wound in the center of the rotor, and a conductor is disposed on both sides of the coil to form magnetic poles. The rotor may generate a magnetomotive force.

The stator is operated via the rotor, and the stator generates an electromotive force and outputs 3-phase AC currents. The stator includes a coil that is wound near the inner recesses of a core of stacked thin steel plates The detector 200 is connected to the rotor shaft 120 according to an exemplary embodiment of the present disclosure. Further, the detector 200 detects the rotation position of the rotor and transmits the detected data to the controller 300.

The detector 200 may include an encoder or a resolver according to an exemplary embodiment of the present disclosure.

The controller 300 may control an electrical energy generated from the alternator 100 for storing in the battery 40 of the vehicle. Further, the controller 300 may control the alternator 100 using the power of the battery 40.

The controller 300 calculates an inverse phase timing of the crankshaft by using a rotation signal of the crankshaft, or a camshaft, that is detected from the engine 10 or an Electronic Control Unit (ECU), and a signal of a spark plug or a fuel injector.

The controller 300 may control the rotor of the alternator 100 to generate a torque ripple according to the inverse phase timing. The torque ripple may have reverse phase relative to a rotation of the crankshaft.

The controller 300 may be implemented with at least one processor operating by a predetermined program, and the predetermined program may be programmed to perform each step according to a method for ripple controlling the alternator according to an exemplary embodiment of the present disclosure.

Figure 2:
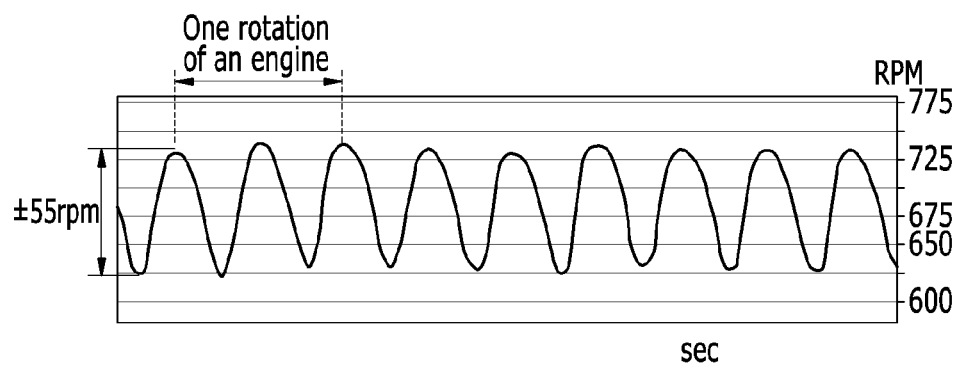
FIG. 2 is a diagram showing a rotational vibration of a crankshaft of an engine.
Figure 3:
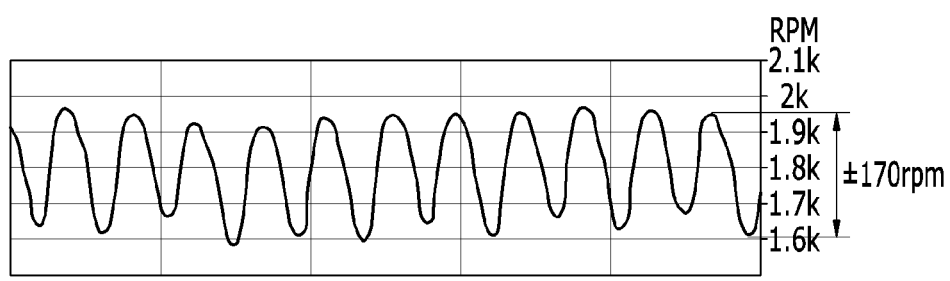
FIG. 3 is a diagram showing a rotational vibration of an alternator pulley of the engine of FIG. 2.

FIG. 2 is a diagram showing a rotational vibration of a crankshaft of an engine, and FIG. 3 is a diagram showing a rotational vibration of an alternator pulley of the engine of FIG. 2.

The crankshaft in an internal combustion engine is unable to rotate at a constant speed since it uses the energy generated by combustion explosions of cylinders, and the rotation of the crankshaft includes a rotation fluctuation of a constant size, as shown in FIG. 2. The fluctuation is variable depending on the number of cylinders and their arrangement, and has a rotation fluctuation component of two cycles per one rotation of the engine at an in-line 4 cylinder engine.

As shown in FIG. 3, the fluctuation is amplified by a pulley ratio in addition to a rotation vibration of the crankshaft. The fluctuation in the pulley 30 the alternator 100 operates as a load of inverse direction to a rotation direction of the accessory belt 20 to drive the alternator 100, and causes a slip and an abrasion of the accessory belt 20.

However, the device for ripple controlling the alternator according to an exemplary embodiment of the present disclosure includes the drive motor (not shown) installed to the alternator 100, and synchronizes rotations of the crankshaft of the engine 10 and rotations of the alternator 100 by load control of the drive motor. As a result, this process reduces the load of the accessory belt 20.

The device for ripple controlling the alternator according to an exemplary embodiment of the present disclosure is capable of improving slip and abrasion at the pulley 30 of the alternator 100 without the pulley having special functions such as an Over-running Alternator Pulley (OAP) or an Over-running Alternator Decoupler (OAD).

Figure 4:
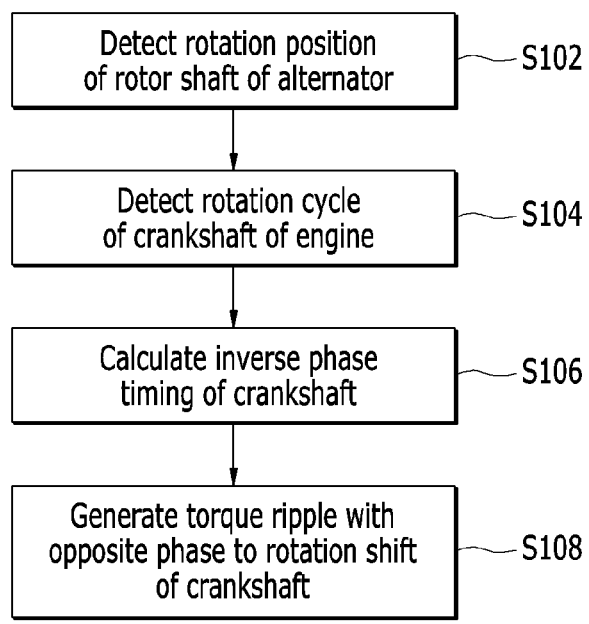
FIG. 4 is a flowchart showing a process of ripple controlling an alternator with a device for ripple controlling the alternator according to an exemplary embodiment of the present disclosure.

FIG. 4 is a flowchart showing a process of ripple controlling the alternator by a device for ripple controlling the alternator according to an exemplary embodiment of the present disclosure. The following flowchart will be described with the same reference numerals as those of FIG. 1.

Referring to FIG. 4, the device for ripple controlling the alternator according to an exemplary embodiment of the present disclosure detects a rotation position of the rotor shaft of the alternator 100 at step S102.

The device for ripple controlling the alternator according to an exemplary embodiment of the present disclosure detects a rotation cycle of a crankshaft of an engine at step S104.

The device for ripple controlling the alternator according to an exemplary embodiment of the present disclosure calculates the inverse phase timing of the crankshaft by using the detected rotation cycle at step S106. Here, the device for ripple controlling the alternator according to an exemplary embodiment of the present disclosure may calculate the inverse phase timing using a rotation signal of the crankshaft or the camshaft, or a signal of the spark plug or the fuel injector.

The device for ripple controlling the alternator according to an exemplary embodiment of the present disclosure generates a torque ripple with an opposite phase to the rotation shift of the crankshaft, and synchronizes a cycle of the rotation shift of the crankshaft and a cycle of the torque ripple at step S108.

Figure 5:
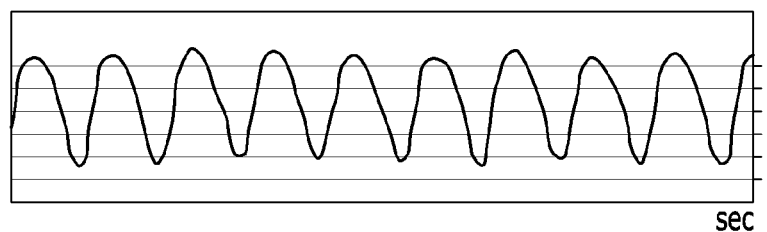
FIG. 5 is a diagram showing a rotation torque of an alternator pulley before and after ripple controlling.
Figure 5:
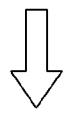
Figure 5:
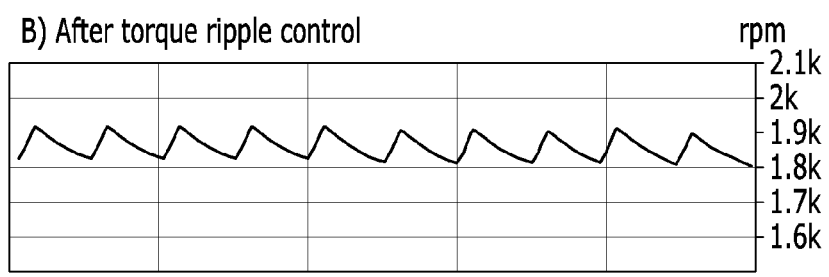

FIG. 5 is a diagram showing a rotation torque of an alternator pulley before and after ripple controlling.

As shown in FIG. 5, the device for ripple controlling the alternator according to an exemplary embodiment of the present disclosure generates a torque ripple with an opposite phase to the rotation shift of the crankshaft by an output current control of the alternator, and reduces a rotation torque shift at the pulley of the alternator.

Therefore, the device for ripple controlling the alternator according to an exemplary embodiment of the present disclosure synchronizes a cycle of the torque ripple of the alternator with the cycle of the rotation shift of the crankshaft. As a result, an environment that is capable of reducing a load of the accessory belt and is capable of improving slip and abrasion at the pulley of the alternator is provided.

The exemplary embodiment of the present disclosure described above is implemented by not only an apparatus and a method but also a program realizing a function corresponding to a configuration of the exemplary embodiment of the present disclosure or a recording medium recording the program.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A device for ripple controlling an alternator, comprising:
    an alternator including a rotor and a stator;
    a detector for detecting a rotation position of the rotor; and
    a controller for controlling the alternator to generate a toque ripple with an opposite phase to a rotation of a crankshaft of an engine, the controller calculating an inverse phase timing of the crankshaft using a signal of a spark plug or a fuel injector.

2. The device of claim 1, wherein the controller controls an output current of the alternator.

3. The device of claim 2, wherein the controller synchronizes a cycle of the rotation of the crankshaft and a cycle of the torque ripple.

4. The device of claim 3, wherein the controller calculates an inverse phase timing of the crankshaft using a rotation signal of the crankshaft or a camshaft that is detected from the engine or an Electronic Control Unit (ECU).

5. A method for ripple controlling an alternator by a device for ripple controlling the alternator, comprising:
    detecting a rotation position of a rotor of the alternator;
    detecting a cycle of a rotation shift of a crankshaft of an engine; and
    generating a torque ripple with an opposite phase to the rotation shift of the crankshaft, the controller calculating an inverse phase timing of the crankshaft using a signal of a spark plug or a fuel injector.

6. The method of claim 5, wherein the step of detecting the cycle of the rotation shift includes calculating an inverse phase timing of the crankshaft.

7. The method of claim 6, wherein the step of calculating the inverse phase timing includes calculating the inverse phase timing using a rotation signal of the crankshaft or a camshaft, or a signal of a spark plug or a fuel injector.

8. The method of claim 7, wherein the step of generating a torque ripple includes synchronizing the cycle of the rotation shift of the crankshaft and a cycle of the torque ripple.

* * * * *